Feb. 21, 1961  H. F. STEMKE  2,972,657
CONNECTOR
Filed May 11, 1956
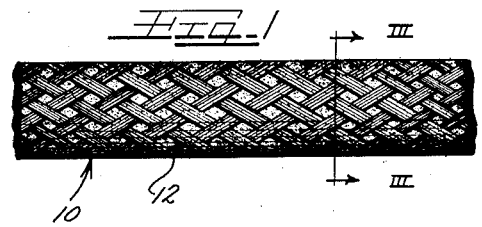
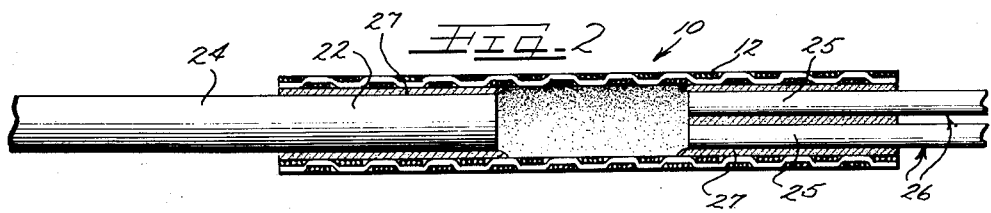
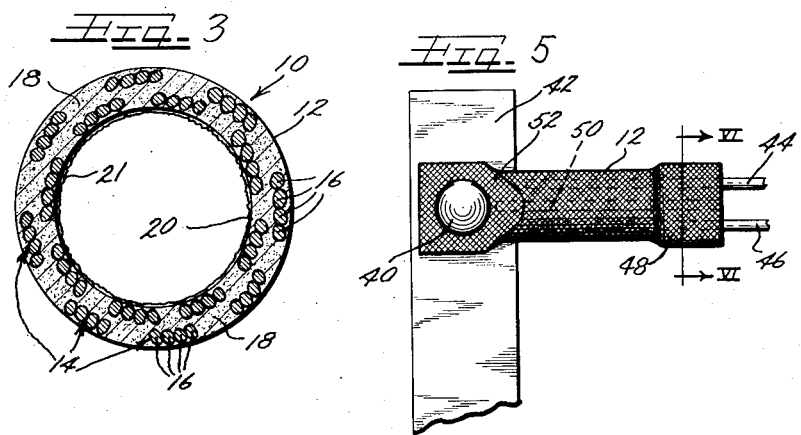
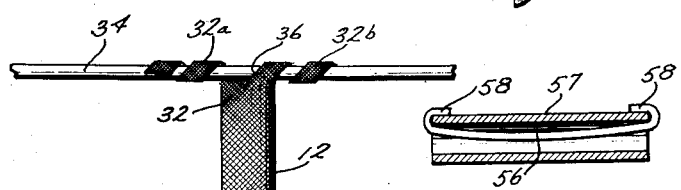
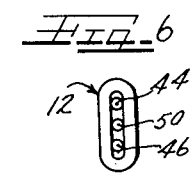
Inventor
HENRY F. STEMKE

United States Patent Office 2,972,657
Patented Feb. 21, 1961

2,972,657

CONNECTOR

Henry F. Stemke, 6822 Beckwith Road, Morton Grove, Ill.

Filed May 11, 1956, Ser. No. 584,230

1 Claim. (Cl. 174—84)

This invention relates to connections as for wires used in electrical and electronic circuits and the like.

An object of the present invention is to provide a new and improved solder-type connection sleeve for joining or splicing wires.

A further object is to provide a novel solder-sleeve of economical yet effective construction which may be readily applied to wires, and which will have advantageous characteristics of electrical conductivity, and advantageous characteristics of heat transmission between both the associated soldering iron and the sleeve, and between the sleeve and the wires to be joined.

Other objects include the provision of a wire-connecting sleeve which has desired and advantageous characteristics of smallness, lightness, convenience, compactness, flexibility, severability, bonding, conductance, ease and rapidity of installation even where working access is extremely limited, effectiveness of the joint, versatility by accommodation for various sizes of wire and accommodation of various types of wire-junctions, removability, reusability, integralness, economy, lack of necessity of special tools, durability, etc.

In carrying out the invention in a preferred embodiment, I provide a pervious tubular member such as a braided metal cable or cable-like sleeve, which is impregnated or charged with solder. The cable is hollow and is adapted to receive in its bore the ends of the wires to be joined. By this construction, the solder on the exterior surface of the cable provides a source of readily meltable metal to aid in the rapid transmission of heat from the soldering tool to the work, and the solder on the interior provides the solder which bonds itself to the wires. The integration provided by the dispersion or diffusion of the solder throughout the cable provides integralness of both portions of the solder, to transmit the heat quickly and to provide good electrical conductivity. The cable provides the mechanical strength and in a preferred embodiment is of electrically conducting material to provide a conductor between the wires, although the conductance of the solder permits a construction in which the solder rather than the cable provides the electrical conductance.

The device is easily installable, preferably by inserting the wires into opposite ends of the sleeve, and a soldering tool is brought into association with the sleeve to effect a melting of the solder sufficient to effect the desired bond. The joint is thus easily made, with a high quality.

These and other and more particular objects, features, and advantages of the present invention will be readily apparent from the following illustrative description thereof, taken in conjunction with the accompanying somewhat diagrammatical drawings, in which:

Figure 1 is a side elevational view of a fragmental length of a connector sleeve according to the present invention;

Figure 2 is a longitudinal cross-section of a connector sleeve as shown in Figure 1, showing one wire spliced to two other wires;

Figure 3 is an enlarged, transverse cross-sectional view of a connector sleeve according to the present invention, the section being taken along the line III—III of Figure 1;

Figure 4 illustrates a sleeve connector of the present invention in a general T-connection arrangement, the sleeve connecting an end of a wire to a non-broken stretch of a associated wire;

Figure 5 illustrates a sleeve connector of the present invention associated with a terminal post;

Figure 6 is a transverse cross-sectional view taken generally along the line VI—VI of Figure 5; and Figure 7 illustrates a longitudinal sectional view of a further modification in accordance with the present invention.

A sleeve-type connector 10 embodying concepts and principles of the present invention is illustrated in the drawings. The connector includes a pervious tubular metal body 12 such as a porous or permeable sleeve, and in a preferred embodiment as shown comprises a generally open-meshed cable or cable-like sleeve made up of strands 14 of individual wires 16. The cable is saturated, diffused or otherwise impregnated or charged with solder 18. The bore 20 of the cable is hollow.

The diameter of the connector 10 may be varied as desired, according to the size of wire with which the connector is to be used, etc. Connectors 10 having bores 20 as small as about 1/32 inch have been made and employed successfully although larger connectors provide a desired versatility and accommodate larger and more wires.

If desired, the connector may be provided with flux, as indicated by the layer or mass 21 in Figure 3.

Figure 2 illustrates a typical installation employing such a connector. As there shown, one end of the connector is sleeved over the end 22 of a first, relatively large diameter wire 24, and the other end of the connector is sleeved over the ends 25 of two relatively small diameter wires 26.

Suitable heat-applying means such as a soldering iron has been touched to the exterior surface of the connector 10, to cause the solder 18 to become melted and cause a portion 27 of that solder to flow into bonding engagement with the wire ends 22 and 25. Preliminary to the application of the heat, the cable 12 may be deformed if desired, particularly to give better mechanical strength to the connection; however this is often times not necessary except perhaps to offset the attraction of gravity of a vertically extending wire or where it is desired to definitely fix the connector along the wire.

Other pervious materials for formation of the body 12 are wire cloth, open-meshed material, porous sintered material, and the like.

Alternative desirable applications and manners of employment of the principles and concepts of the present invention are illustrated in Figs. 4, 5, 6, and 7.

As illustrated in Fig. 4, a connector sleeve 12 is shown as having one end 30 thereof connected to a wire 31 as indicated in the preceding figures, but having its other end 32 connected to an associated wire 34 as by wrapping the connector around the wire 34 rather than receiving the wire within the bore of the connector sleeve. Such an application might be most likely used, for example, in a situation where a wire 31 is to be connected to a non-broken stretch of an associated wire 34. As shown, the sleeve portion 32 is slit lengthwise as indicated by reference numeral 36, providing a split or dual striplike means 32a—32b to be twisted around the wire 34.

Figures 5 and 6 illustrate a connector sleeve 12 according to the present invention in a typical situation in which the sleeve may provide a junction or terminal connector. Thus the sleeve 12 has one end thereof riveted as by a rivet 40 to a connection post 42 suitably formed of conducting or non-conducting material. A pair of wires 44 and 46 are shown as inserted into the open end of the sleeve 12, preliminary to the application of heat to the sleeve.

If desired, a connector sleeve according to my invention may be deformed as by pinching, crimping, or meshing, as indicated at 48, to more positively hold the relationship of the wires and sleeves.

Auxiliary solder, flux, or the like may be provided if desired. As shown in Figs. 5 and 6, auxiliary mass of solder in the form as of a pellet, flake, ribbon, or strip 50 is shown as provided within the bore of the sleeve 12, and held as by the crimped sleeve portion 52 adjacent the rivet 40. It may carry flux if desired.

Figure 7 illustrates an alternative arrangement, providing substantial quantities of solder as for splicing of relatively large wires, line wires, and the like. As there shown a length of solder 56 is inserted longitudinally into the bore of a sleeve 57, the sleeve being solder-impregnated as above or not as desired. The solder may carry flux. The ends 58 of the solder 56 are retroverted over the ends of the sleeve, holding the solder in place, and providing exteriorly-presented solder surfaces which are readily meltable to provide good heat-transmitting effects when engaged by the soldering tool. The solder 56 here may act as a deformable member or wedge to hold by frictionally engagement wires inserted into the sleeve.

A connector constructed according to concepts of the present invention is highly advantageous. It is small and light. It is very convenient in its application, merely requiring in most situations that it be slipped into place and touched with the soldering tool. Ordinarily no auxiliary solder is required. The connector provides a good electrical joint, with good conductance, good bonding, and generally very satisfactory electrical properties. It is mechanically strong and satisfactory. Its size with relation to the wire size is not ordinarily critical, and hence a single size can serve a variety of sizes and quantities of wires. The connection is very durable and permanent, and although of permanent character its ease of application and removal makes it desirable even for temporary connections. It is re-usable; and may be re-used a great many times by an occasional addition of a drip of solder. It is very economical, from the standpoints of both cost of the connector and cost of the installation. No special tools, such as special crimping tools, are necessary; and where crimping is deemed desirable, it may be effected ordinarily by common tools such as standard pliers and the like. These and other advantages make the connection very desirable.

It will thus be seen from the foregoing description, considered in conjunction with the accompanying drawings, that the present invention provides a new and improved connector having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

As an article of manufacture, a connector for joining electric wires by means of solder carried by the connector comprising a tubular braided metal sleeve of short length to conveniently receive the ends of electric wires to be connected at the respective ends of the sleeve, said sleeve having an elongated bore extending longitudinally of the sleeve throughout the length of the sleeve and having recesses opening respectively at the exterior thereof and at the interior thereof and having interstitial passages connecting the exterior recesses with adjacent interior recesses, said sleeve being impregnated with solder throughout its length to provide solder in the interior and exterior recesses and in the interstitial passages to rigidly retain the solder with the sleeve and to provide highly efficient heat transfer paths from the exterior of the sleeve to a wire inserted into the bore of the sleeve, said sleeve bore being open and unobstructed over the entire cross section and length thereof at each end of the sleeve with the solder at the interior of said sleeve being in direct unobstructed communication with the bore over the length of the bore for conductive connection with the ends of electric wires to be inserted into the respective ends of said bore in use of said connector.

References Cited in the file of this patent

UNITED STATES PATENTS

| | | |
|---|---|---|
| 294,549 | Waring | Mar. 4, 1884 |
| 355,611 | Hawson | Jan. 4, 1887 |
| 1,640,869 | Armstrong et al. | Aug. 30, 1927 |
| 1,702,756 | Woodbridge | Feb. 19, 1929 |
| 2,166,109 | Karmazin | July 18, 1939 |
| 2,569,667 | Harvey et al. | Oct. 2, 1951 |
| 2,652,623 | Marden | Sept. 22, 1953 |
| 2,664,844 | Siegrist et al. | Jan. 5, 1954 |
| 2,675,532 | Quick | Apr. 13, 1954 |

FOREIGN PATENTS

| | | |
|---|---|---|
| 735,835 | Great Britain | Aug. 31, 1955 |